United States Patent [19]
Uneme et al.

[11] Patent Number: 5,947,627
[45] Date of Patent: *Sep. 7, 1999

[54] BALL JOINT ASSEMBLY HAVING AN INTEGRALLY MOLDED UNITARY OR MOLDED HOLDER FOR THE BALL STUD AND LINK ROD

[75] Inventors: Masato Uneme, Nagoya; Katsuyuki Kono, Toyota, both of Japan

[73] Assignee: Chuouhatsu-jo Kabushiki Kaisha, Nagoya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/798,308

[22] Filed: Feb. 7, 1997

[30] Foreign Application Priority Data

Feb. 14, 1996 [JP] Japan ................. 8-052390

[51] Int. Cl.⁶ .................................................. F16C 11/00
[52] U.S. Cl. ..................... 403/122; 403/130; 403/134; 29/898.049
[58] Field of Search ................... 403/140, 122, 403/135, 130, 131, 132, 133, 134; 29/898.04, 898.049

[56] References Cited

U.S. PATENT DOCUMENTS

| | | | |
|---|---|---|---|
| 3,833,309 | 9/1974 | Hobbs | 403/122 |
| 4,568,216 | 2/1986 | Mizusawa et al. | 403/122 X |
| 4,601,603 | 7/1986 | Nakayama | 403/122 X |
| 4,758,110 | 7/1988 | Ito | 403/122 X |
| 5,009,538 | 4/1991 | Shirai et al. | 403/122 X |
| 5,011,321 | 4/1991 | Kidokoro | 403/122 X |
| 5,092,703 | 3/1992 | Kobayashi | 403/122 |
| 5,395,176 | 3/1995 | Zivkovic | 403/122 |
| 5,609,433 | 3/1997 | Pazdirek et al. | 403/122 X |
| 5,611,635 | 3/1997 | Schutt et al. | 403/122 X |

Primary Examiner—Terry Lee Melius
Assistant Examiner—William L. Miller
Attorney, Agent, or Firm—Lackenbach Siegel Marzullo & Aronson

[57] ABSTRACT

A ball joint having a ball stud provided with an integral spherical portion at one end thereof. A unitary molded synthetic resin body forms a molded holder having a concavity in which the spherical ball portion is tightly held disposed rotatable omnidirectionally and tiltable therein. The concavity has an opening of a lesser diameter than a maximum diameter of the concavity so that the spherical portion of the ball stud can be pressure-fitted into the concavity with the ball stud extending axially laterally of the molded holder. A link rod having a circular annular end held by the molded holder extends laterally of the holder defining in assembly with the ball stud a ball joint. The annular end is embedded in the synthetic resin of the molded holder and has an internal diameter substantially coaxial with the ball stud and greater than the diameter of ball stud spherical portion so that the synthetic resin concavity and the spherical ball portion have opposed smooth surfaces. The annular end of the link rod position and relative dimension to the spherical portion of the link rod improves the strength of the holder for holding the ball stud and link rod in assembly. The components of the ball joint can all be made of synthetic resin or the ball stud can be metallic. The link can be made with integral annular opposite ends with molded holders thereon in which are disposed respective ball studs. Both the ball stud and the link rod can be insert-molded in the synthetic resin.

12 Claims, 5 Drawing Sheets

BALL JOINT ASSEMBLY HAVING AN INTEGRALLY MOLDED UNITARY OR MOLDED HOLDER FOR THE BALL STUD AND LINK ROD

BACKGROUND OF THE INVENTION

1. Field of the Invention

The present invention relates to a ball joint utilizing a ball to connect two links so as to be relatively rotatable and tiltable.

2. Description of the Prior Art

As shown by FIG. 7 of the accompanying drawings, the typical ball joint of prior art is constructed by welding a rod b to a metal housing a, a spherical portion e of a ball stud d with a ball seat c made of synthetic resin, fitting this spherical portion e into the housing a, then caulking a bottom lid I to the housing a, thereafter inserting a lower end of a duet boot f into a groove h formed around the housing a and fixing this dust boot f by with a ring boot g. In view of such construction, relatively many parts required by the ball joint of prior art increase cost of parts as well as cost for assembling these parts and particularly the metal housing of complicated shape further increases the manufacturing cost.

Furthermore, to avoid a rigidity loss of the ball joint which may occur when the parts have been assembled with a play, the ball seat c is often pressed into the housing a. This may result in unevenness of various dimensions such as an inner diameter of the housing a and inner and/or outer diameters of the ball seat c, which may cause, in turn, the rotatable and tiltable performances desired for the ball joint to be deteriorated. Particularly, welding the rod b to the housing a is liable to distort the housing a.

SUMMARY OF THE INVENTION

The invention aims to solve the problem left behind by the conventional ball joint unsolved such that the number of parts is too large to maintain high accuracies for the respective parts themselves as well as for assembling these parts and cost required for provision of these parts as well as for assembling these parts.

Said problem is solved by the ball joint according to the invention defined by each of the appended claims.

In one embodiment, the ball joint comprises a rod and a holder provided with a spherical concavity having an opening of which the diameter is smaller than the maximum inner diameter of said spherical concavity, said rod and said holder being integrally molded from synthetic resin, and a ball stud made of tetallic material formed on its forward end with a spherical portion adapted to be tightly but rotatably received by said spherical concavity. With this construction, the ball joint comprises, strictly to say, only two parts, i.e., the ball stud and the holder which is molded integrally with the rod from syntdhetic resin. Such small number of parts contributes to reduction of the manufacturing cost and the molded spherical concavity of the holder necessarily ensures a sphericity to be sufpiciently high to minimize a play possibly resulting from assembling of the parts, thereby enabling the ball joint to be smoothly rotated and/or tilted.

In a second embodiment, the ball joint comprises a metal rod having a forward end with a noncircular cross-section, a holcer made of synthetic resin provided with a spherical concavity having an opening of which the diameter is smaller than the maximum inner diameter of said spherical concavity, said forward end of the metal rod being insert-molded in said holder, and a ball stud made of metallic material formed on its forward end with a spherical portion adapted to be tightly but rotatably received by said spherical concavity. This construction is particularly suitable for use in a situation where it is required to withstand a relatively heavy load, since the rod is made of metallic material.

In a third embodiment, the ball joint comprises a metal rod having on its forward end a metal ring integrally formed therewith, a holder made of synthetic resin provided with a spherical concavity having an opening of which the diameter is smaller than the maximum inner diameter of said spherical concavity, said metal ring being insert-molded in said holder so that said metal ring may surround said spherical concavity, and a ball stud made of metallic material formed on its forward end with a spherical portion adapted to be tightly but rotatably received by said spherical concavity. Such construction is effective to improve a strength of the holder, since the metal ring integrally formed with the rod is embedded in the holder.

The ball joint each embodiment is characterized by that the spherical portion of the ball stud is rotatably insert-molded in said holder. The spherical concavity of the holder is molded so as to be accurately engaged with the spherical portion of the ball stud without a play and thereby to achieve the smooth rotation and tilting.

The ball joint in each embodiment is characterized by that the spherical portion of the ball stud is rotatably pressed into the spherical concavity of the holder. Such construction allows the parts to be easily assembled at a relatively low cost.

The ball joint in each embodiment is characterized by lubricating film is formed between the spherical portion and the spherical concavity. This feature is effective to improve a relative slidability of the spherical portion of the ball stud and the spherical concavity of the holder.

DESCRIPTION OF THE PREFERRED EMBODIMENTS

Details of the invention will be more fully understood from the following description of the preferred embodiments given hereunder in reference with the accompanying drawings.

Figure 1:
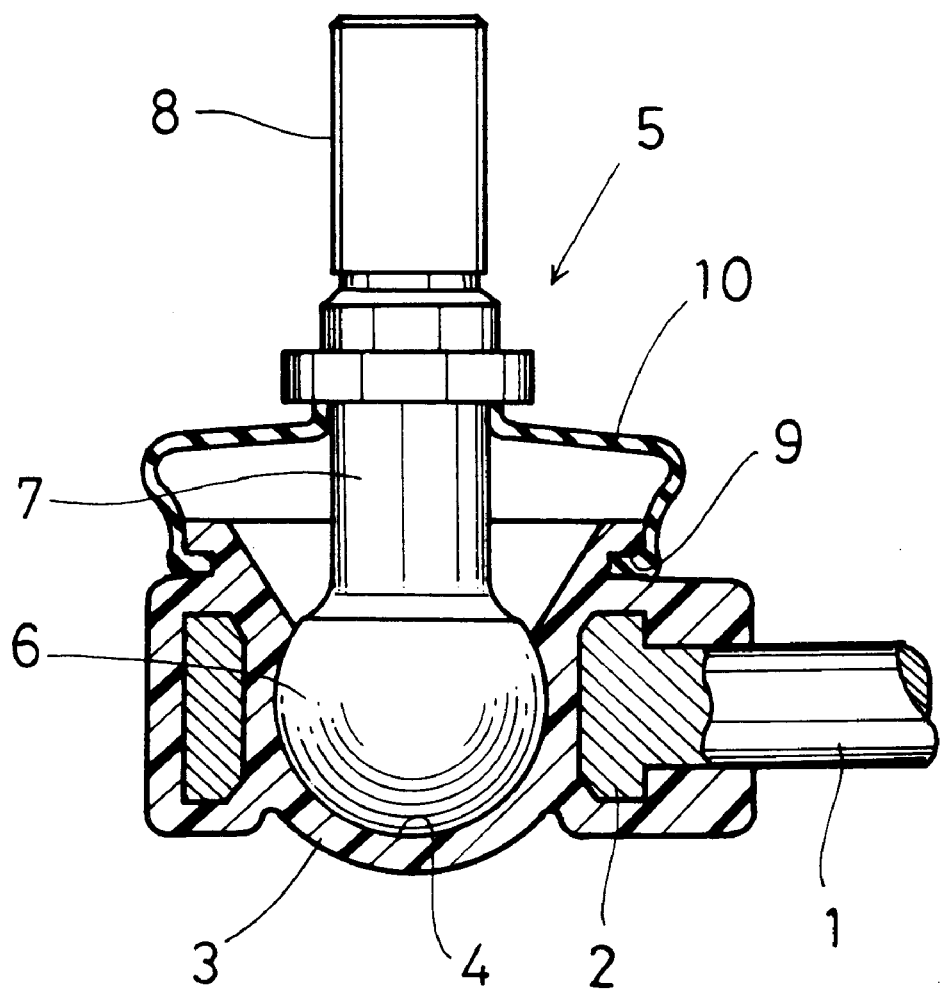
FIG. 1 is a sectional view showing a first embodiment of the invention.

Referring to FIG. 1, reference numerals 1 and 2 respectively designate a rod made of metallic material such as steel and one of rings made of metallic material such as steel and integrally formed on longitudinally opposite ends of said rod 1: The ring 2 is integrally insert-molded in a holder 3 which is made of synthetic resin and centrally provided with a spherical concavity 4 having an opening of which the diameter is smaller than the maximum inner diameter of said spherical concavity 4 so that said ring 2 surrounds said spherical concavity 4.

Reference numeral 5 designates a ball stud made of metallic material such as steel and comprising a spherical portion 6, a shank portion 7 and a screw portion 8. The spherical portion 6 is tightly received by the spherical concavity 4 of the holder 3 but omnidirectionally rotatable and tiltable therein.

Figure 3:
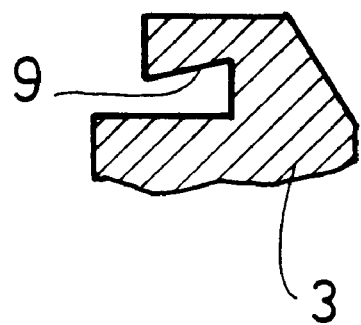
FIG. 3 is a scale-enlarged sectional view showing a variant of a groove formed around a holder to mount a dust boot.
Figure 2:
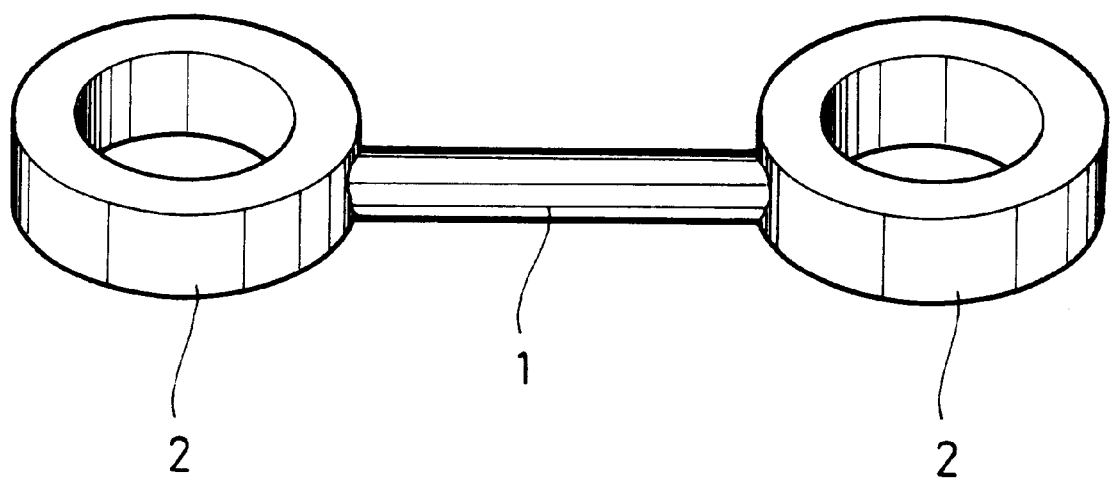
FIG. 2 is a perspective view showing rings and a rod serving as a core bar of a twin ball joint.

The opening of the holder 3 is covered with a dust boot 10 having a lower end inserted into a groove 9 formed around the holder 3. The groove 9 is preferably configured so as to have a inwardly widened dovetail-like cross-section, as shown by FIG. 3, in order to prevent the dust boot 10 from unintentionally slipping out from the groove 9.

Figure 4:
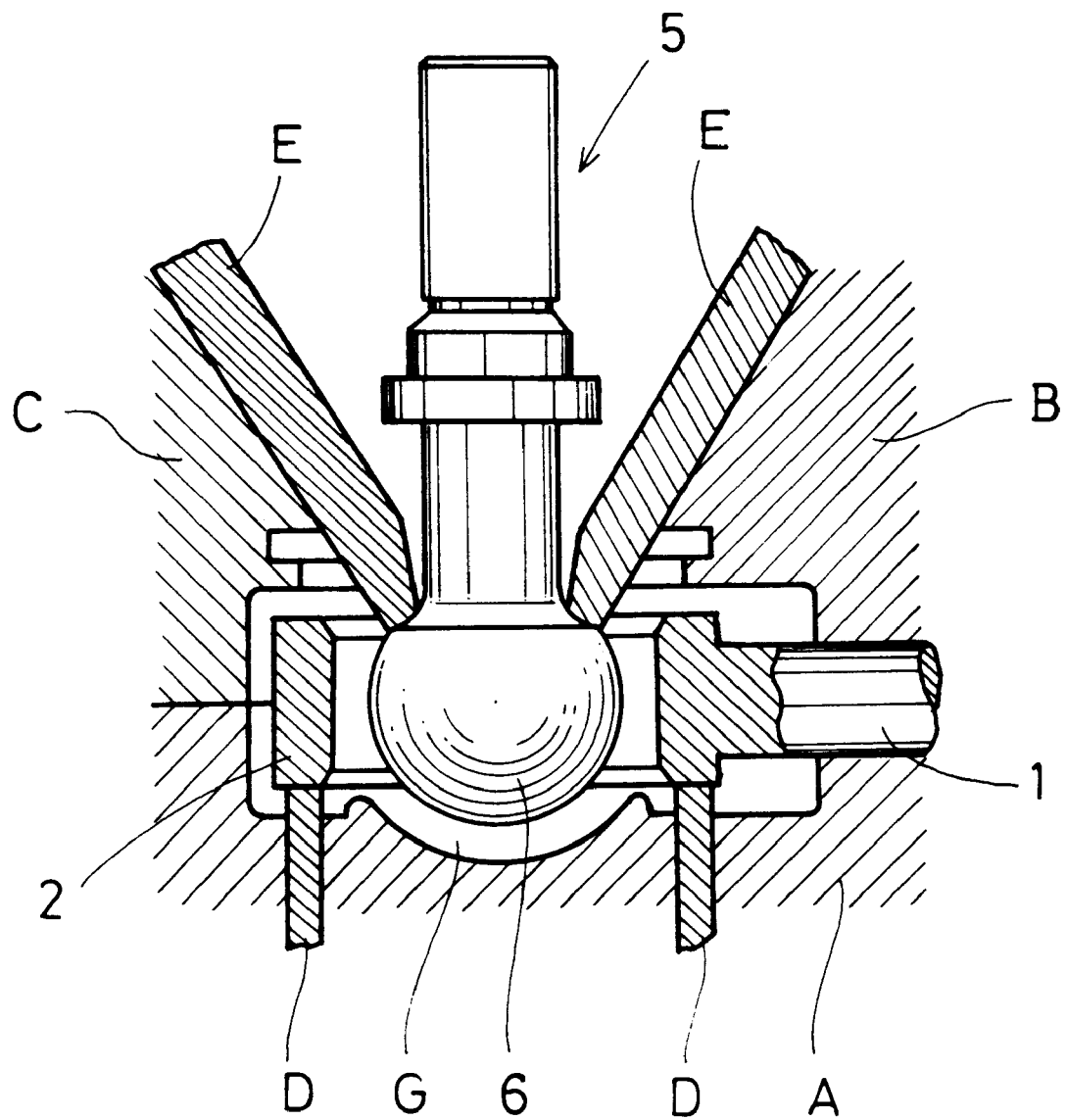
FIG. 4 is a sectional view showing a mold to be used for insert-molding of a ball joint in the first embodiment.

While the holder 3 may be elastically deformed by forcibly pressing the spherical portion 6 of the ball stud 5 against the opening of the holder 3 and thereby said spherical portion 6 may be engaged with the spherical concavity 4, it is also possible, as shown by FIG. 4, to support the rod 1 and the ring 2 by supporting members D, D, and supporting the ball stud 5 by supporting members E, E within a cavity G defined by split molds A, B and C and then to pour synthetic resin material into said cavity G to insert-mold the spherical portion 6 together with the rod 1 and the ring 2.

Immediately before this process of insert-molding, the spherical portion 6 is preferably coated with silicone serving as release agent to prevent the synthetic resin from sticking to the spherical portion 6 or the synthetic resin material is mixed with potassium stearate or barium stearate in order of 0.5~1.0% by weight to improve a relative slidability between the spherical portion 6 of the ball stud 5 and the spherical concavity 4 of the holder 3.

Said relative slidability of the spherical portion 6 and the spherical concavity 4 can be further improved when lubricating film is formed between the spherical portion 6 and the spherical concavity 4 by coating the spherical portion 6 of the ball stud 5 with suitable lubricant such as molybdenum disulfide ($MoS_2$) or graphite before insert-molding with the synthetic resin.

Figure 5:
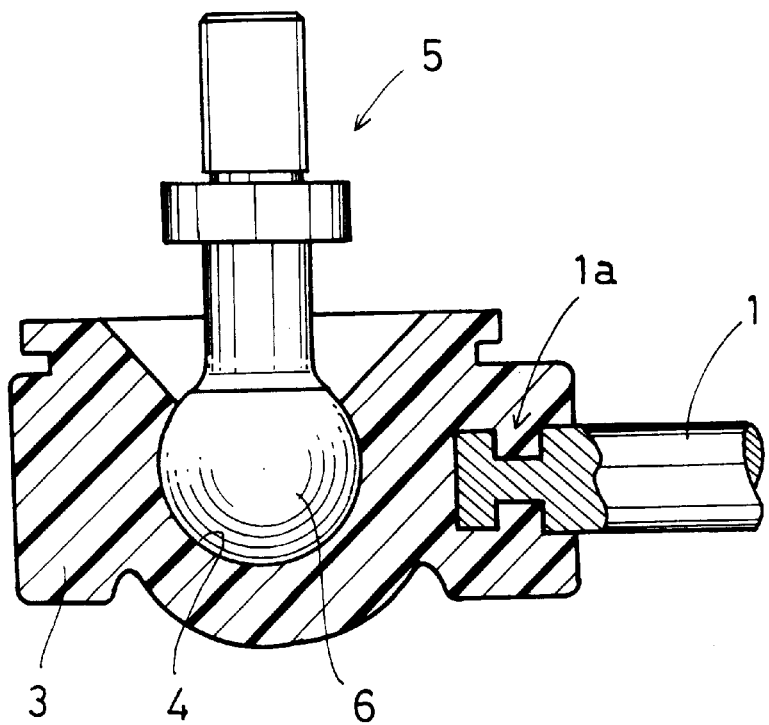
FIG. 5 is a sectional view showing a second embodiment of the invention.
Figure 6:
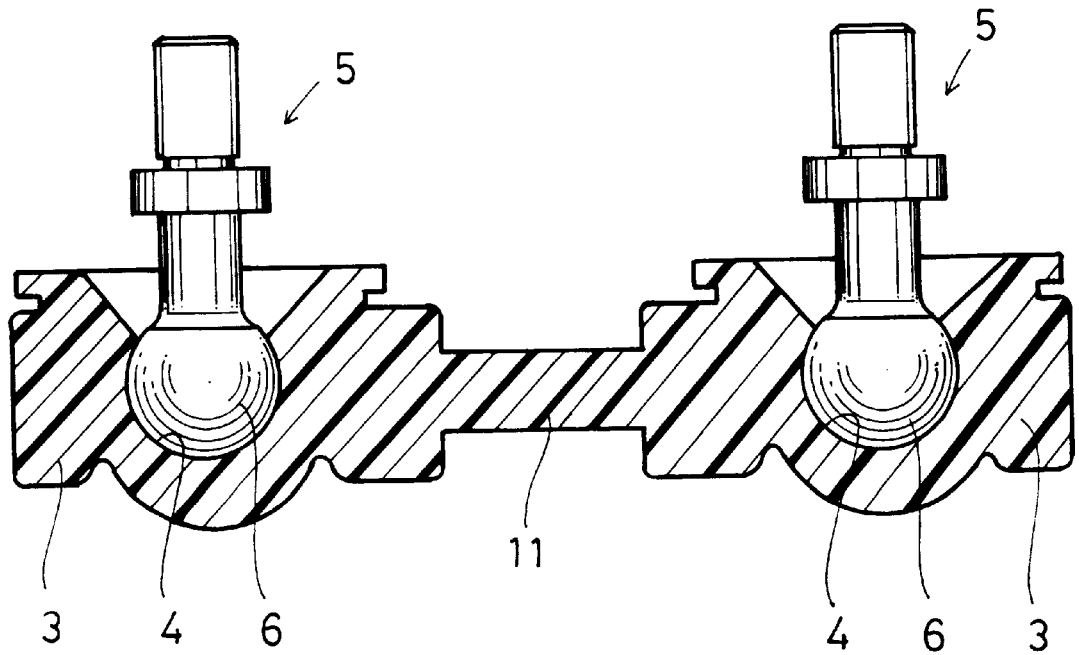
FIG. 6 is a sectional view showing a third embodiment of the invention.
Figure 7:
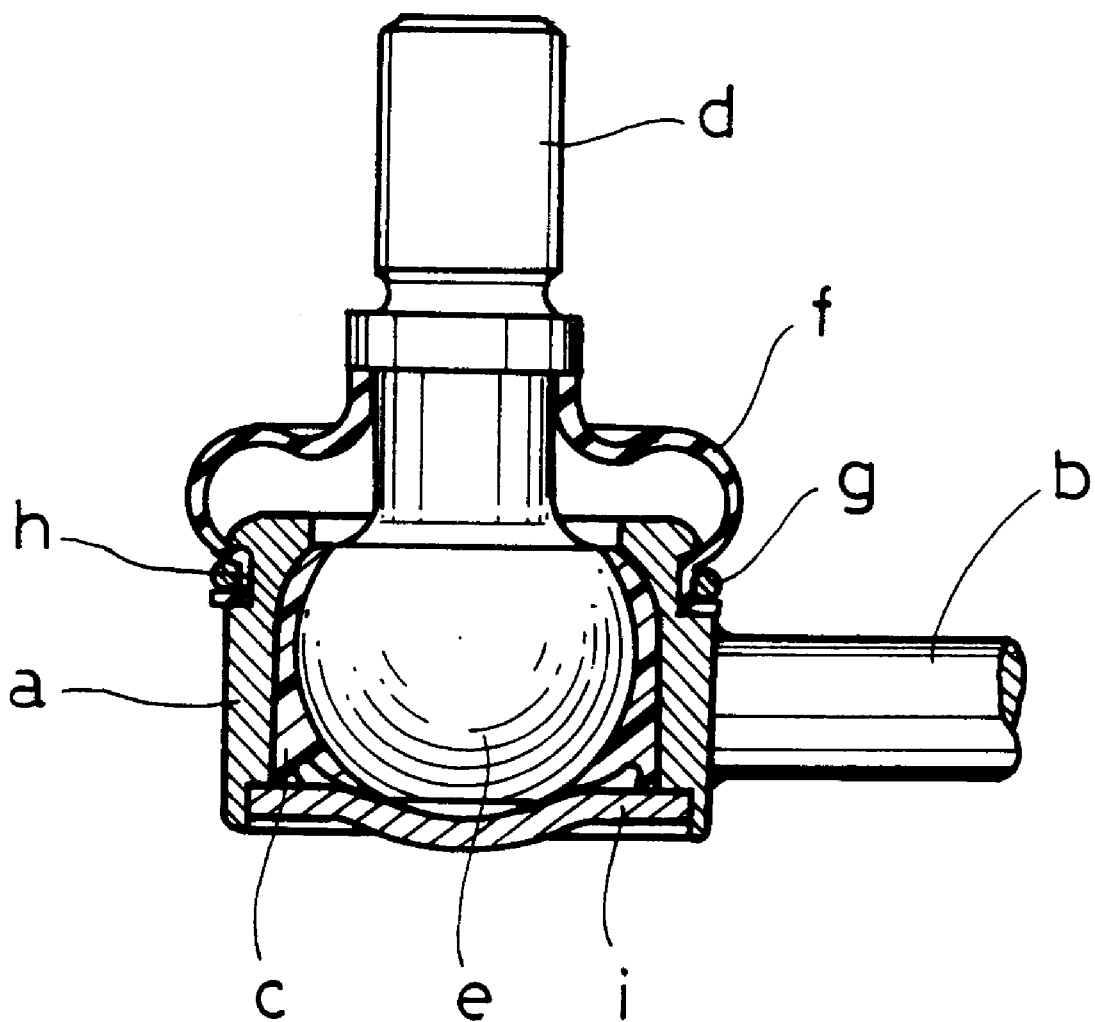
FIG. 7 is a sectional view exemplarily showing a ball joint of prior art.

FIG. 5 shows an alternative embodiment which is different from the embodiment shown by FIG. 1 in that the metal ring 2 is eliminated, the forward end 1a of the metal rod 1 is provided with so-called width across flats so as to present a noricircular cross-section and only this forward end 1a is insert-molded. FIG. 6 shows still another embodiment which is different from the embodiment shown by FIG. 1 in that not only the metal ring 2 but also the metal rod 1 are eliminated and a pair of holders 3 connected by a rod 11 serving as a connector member are integrally molded. Both the embodiments are suitable for use under a small load and the method for manufacturing them is similar to the method for manufacturing the ball joint as has been described in reference with the embodiment shown by FIG. 1.

For the synthetic resin material forming the holder, contraction percentage as well as directional ratio of contraction percentages (i.e., ratio of the contraction percentage in the direction of injection to the contraction percentage in the direction orthogonal to said direction of injection of the synthetic resin material during injection molding) must be as small as possible from the functional view point. To meet such requirement, aromatic polyamide (MXDPA) and liquid crystal polymer (LCP) are suitable as material for the holder, because the aromatic polyamide exhibits a contraction percentage as small as approximately 0.28~0.3% and a directional ratio of contraction percentages also as small as 1.07 and the liquid crystal polymer exhibits a contraction as small as approximately 0% and a directional ratio of contraction percentages also as small as approximately 1.

We claim:

1. An improved ball joint assembly made by a molding process embodying single molded step, comprising:

a ball stud having an integral spherical portion;

a link rod having a ring disposed about said spherical portion; and insert molding an integral unitary body forming a molded holder surrounding and contacting substantially the entire said spherical portion of said ball stud and simultaneously substantially encapsulating the entire said ring of said link rod;

said molded holder comprising a synthetic resin having a spherical concavity in which said integral spherical portion of said ball stud is tightly held rotatable omnidirectionally and tiltable therein;

said spherical concavity having an opening through which said ball stud extends axially laterally of the molded holder;

said opening or said spherical concavity having a diameter less than a maximum diameter of said spherical concavity for holding the integral spherical portion of said ball stud internally of the spherical concavity;

said ring of said link rod being an annular end embedded in said molded holder holding the link rod and said ball stud in said ball-joint assembly; and said annular end of said link rod having an internal diameter greater than the diameter of said integral spherical portion and said annual end of said link rod disposed outwardly and circumferentially of said spherical portion.

2. A ball joint assembly according to claim 1, in which said ring is circular.

3. A ball joint assembly according to claim 1, in which said annular end of said link rod is substantially coaxial with a longitudinal axis of said ball stud.

4. A ball joint assembly according to claim 1, in which said ball stud is metallic.

5. A ball joint assembly according to claim 1, in which said ball stud and integral spherical portion are also made of synthetic resin.

6. A ball joint assembly according to claims 5, in which said link rod is made of synthetic resin.

7. A ball joint assembly according to claim 1, in which said ball stud and said link rod are metallic.

8. A ball joint assembly according to claim 1, wherein a release agent is applied before said insert molding step to said spherical portion of said ball stud to prevent said synthetic resin from sticking to said spherical portion thereby improving slidability between said spherical portion and said spherical concavity.

9. A ball joint assembly according to claim 1, wherein said synthetic resin is mixed with potassium/barium stearate for improving slidability between said spherical portion and said spherical concavity.

10. A ball joint assembly according to claim 9, wherein about 0.5 to about 1.0% by weight of said potassium/barium stearate is mixed with said synthetic resin.

11. A ball joint assembly according to claim 1, further including a lubricating film between said spherical portion and said spherical concavity for improving slidability there between.

12. A ball joint assembly according to claim 11, wherein said lubricating film is selected from the group consisting of graphite, molybdenum disulfide and mixtures thereof.

* * * * *